May 29, 1951     C. L. VICKERS     2,554,758
PISTON RING
Filed June 5, 1948

Inventor
Clyde L. Vickers.
By
E. V. Hardway,
ATTORNEY.

Patented May 29, 1951

2,554,758

UNITED STATES PATENT OFFICE 2,554,758

PISTON RING

Clyde L. Vickers, Texas City, Tex.

Application June 5, 1948, Serial No. 31,342

4 Claims. (Cl. 309—41)

This invention relates to a piston ring.

An object of the invention is to provide a piston ring which is expansible and which is provided with a type of expanders, mounted in the ring, in a novel manner, and which will efficiently maintain the piston ring expanded into yielding contact with the cylinder walls when the ring is mounted on the piston which operates in said cylinder.

It is another object of the invention to provide, in a piston ring, expanders which are not liable to become displaced while mounting the rings on the piston or during the operation of the piston in the cylinder.

A further object of the invention is to provide a spring expander which will hold the ring firmly against the cylinder walls and which will yield so that the piston rings equipped with said expanders will follow closely the walls of the cylinder, even when said walls are irregular, to thus minimize the leakage of lubricant past the piston rings.

It is a further object of the present invention to provide a piston ring which is provided with bearings that are suitably spaced to receive the ends of the expanders and wherein said bearings are lined with wear resisting sleeves which will maintain said bearings against enlargement due to wear.

The preferred type of piston ring containing the improvement is composed of sections whose ends overlap although the invention may be used with a unitary type of ring split at one side only.

Other objects and advantages will be apparent from the following specification which is illustrated by the accompanying drawings, wherein.

Referring now more particularly to the drawings wherein like numerals of reference designate the same parts in each of the figures, the numeral 1 designates a ring section which is arcuate in shape and which is formed of two complemental parts riveted together by means of rivets, as 2. This type of section is preferable for the reason that in the manufacture of the section substantially no material is wasted whereas if the section were unitary, as shown in Figure 4, the material cut out to stagger the ends would be wasted; furthermore, in a ring composed of sections such as shown in Figure 3 only the parts of one of the sections need be riveted together and the two complemental parts of the other sections of the ring need not be riveted together since the section whose parts are riveted together will hold the parts of the other two sections in proper position.

Figure 1:
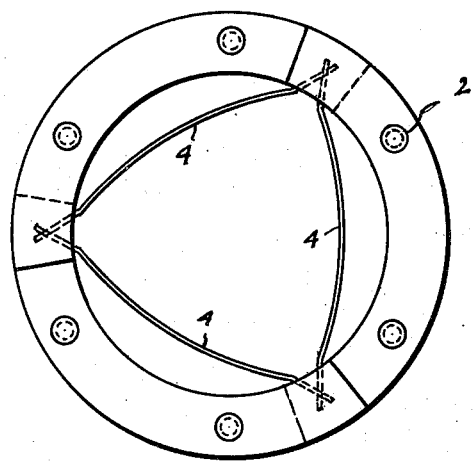
Figure 1 is an elevational view of a sectional type of ring showing the expanders mounted in place.

As illustrated in Figure 1 there are three of these sections assembled to form a complete ring.

Figures 3, 4, 5:
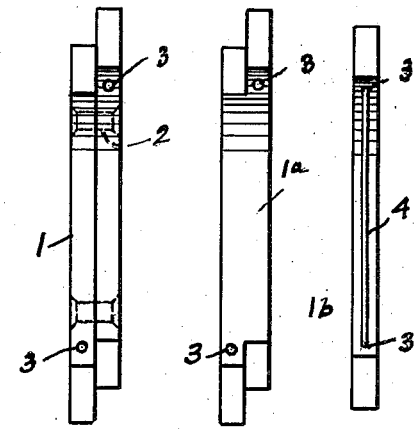
Figure 3 is an inside view of a section of the type of ring shown in Figure 1 with the expander removed and wherein the section is formed of two parts riveted together.
Figure 4 is an inside view of an integral type of ring with the expander removed.
Figure 5 is an inside view of another type of ring section which may be employed showing the expander mounted in place.
Figure 2:
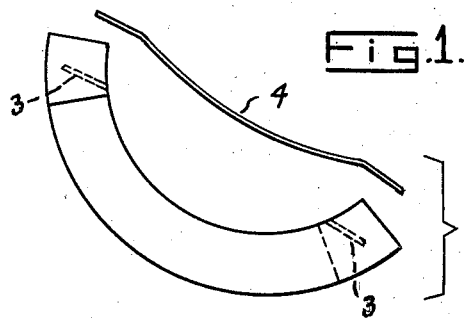
Figure 2 is a side elevation of a single section showing the accompanying spring-like expander.

It will be noted that the two parts of the section 1, as shown in Figure 3, and which are riveted together are of the same length but each of their ends are staggered so that when the sections are assembled in a complete ring the ends will overlap as indicated in Figure 1.

The opposing ends of the section 1 have relatively deep inside bearings, as 3, 3.

As clearly indicated in Figure 3 these bearings are disposed diagonally relative to each other, that is the bearings are in the projecting ends of the section.

As illustrated in Figure 4 each section 1a of the ring is unitary rather than being formed of two parts riveted together, as shown in Figure 3. In this form of the ring each section is provided with the end bearings 3, 3, as shown in Figure 3.

Of course, the end bearings 3, 3 may be arranged as found most practical.

They may be located on a common circumferential line instead of being off set or diagonally related to each other.

There are the spring-like expanders, as 4. These expanders may be of durable spring wire. Preferably they are normally of a slightly arcuate shape between the ends with said ends slightly bent outwardly so as to fit into the end bearings 3, 3.

In the form illustrated in Figure 5 a single arcuate section 1b of the piston ring is shown. In this type of ring the section 1b is also formed with inside and bearings to receive ends of the expander 4. If a piston ring composed of sections such as shown in Figure 5 is employed each ring should be made up of two series of sections, the series lying in side by side relation but the sections of one series being staggered with respect to the sections of the other series so as to break the joints between them.

Figure 6:
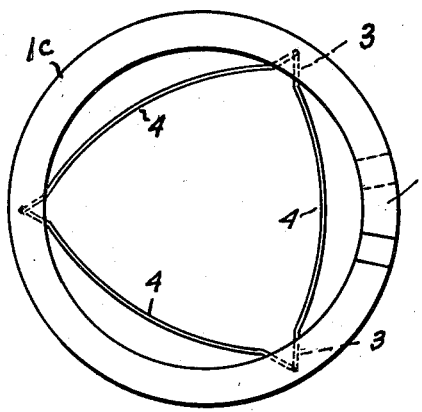
Figure 6 is an elevational view of a continuous ring split on one side only showing the expanders mounted therein.
Figure 7:
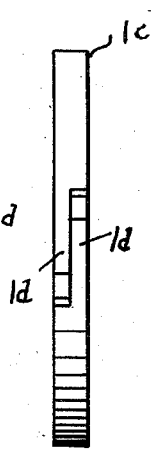
Figure 7 is an edge view thereof.

In the form illustrated in Figures 6 and 7 the piston ring 1c is continuous but is split at one side only with the free ends 1d, 1d overlapping, as shown in Figure 7. This type of ring is also provided with pairs of inside expander bearings 3, 3, as in the other forms. Preferably three pairs of these bearings will be employed in this form to receive the ends of the expanders 4 just as in the form shown in Figure 1 although the number of pairs of bearings and the corresponding number of spring expanders may be varied if found practical.

When the piston ring of either form is mounted on a piston the expanders will be forced outwardly by the piston adjacent the inner surfaces of the ring sections so that the expanders will be placed under tension and will constantly tend to expand the rings of either form so that they will be maintained in close contact with the cylinder walls irrespective of wear on the outer surfaces of the piston rings or on the cylinder walls and as this wear occurs the expanders will constantly expand the piston rings to take up the wear.

The bearings 3 are of sufficient depth and the corresponding ends of the expanders 4 are of sufficient length to prevent detachment of an end of an expander from the corresponding section of the ring so that each expander will at all times remain as a unit with its ring section.

Figure 8:
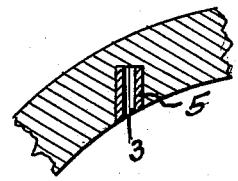
Figure 8 is an enlarged, fragmentary, sectional view showing a hardened liner in the expander bearing.

If desired the bearings 3 may be lined with a sleeve-like liner 5, such as shown in Figure 8, to minimize wear, said liner being of wear resisting material.

What is now considered preferred forms of the invention have been shown and described for the purpose of illustration only and not by way of limitation; while the broad principle of the invention will be defined by the appended claims.

What I claim is:

1. In combination, an expansible piston ring having a plurality of pairs of inside bearings, the bearings of each pair being spaced apart circumferentially of the ring and offset axially thereof, flexible expanders each expander having ends fitted closely into the corresponding bearings of the respective pairs so that said ends can move only axially, said expanders being arranged in spaced relation around the ring, the ends being of sufficient length to be retained in the bearings when the expanders are expanded outwardly a sufficient distance to form a circle having a common center.

2. A piston ring formed of a plurality of arcuate sections which, when assembled, form a substantially circular ring, each section having inside end bearings offset axially of the ring, a flexible expander for each section, each expander having ends shaped to fit snugly into the bearings of its ring section, said ends being of sufficient length to be retained in the bearings when the expander between the ends is forced into contact with the inside of its section.

3. A piston ring formed of a plurality of similar sections which, when assembled, form a substantially circular ring, each section of the ring being formed of two similar arcuate parts whose ends are staggered at each end of the section so that the ends will over-lap when the sections are assembled an inside bearing in each end of each section, and a flexible expander whose ends are fitted into the bearings of each section, said expanders being arranged in spaced relation around the ring.

4. A piston ring formed of a plurality of arcuate sections which when assembled, form a substantially circular ring, each section comprising a plurality of complemental parts of the same length arranged with their ends in staggered relation, the parts of one of the sections being secured together and the sections being arranged with their ends in overlapping relation, each section having inside end bearings offset axially of the ring, a flexible expander for each section, each expander having ends shaped to fit into the bearings of its ring section, said ends being of sufficient length to be retained in the bearings when the expander between the ends is forced into contact with the inside of its section.

CLYDE L. VICKERS.

REFERENCES CITED

The following references are of record in the file of this patent:

UNITED STATES PATENTS

| Number    | Name       | Date          |
|-----------|------------|---------------|
| 1,401,178 | Mohn et al.| Dec. 27, 1921 |
| 1,607,779 | Norton     | Nov. 23, 1926 |
| 1,834,884 | Wilson     | Dec. 1, 1931  |
| 2,175,465 | Johnson    | Oct. 10, 1939 |